H. I. CHASE, P. F. CHASE, & E. D. CHASE.

Grain-Elevators.

No. 6,227. Reissued Jan. 12, 1875.

Figure 1:
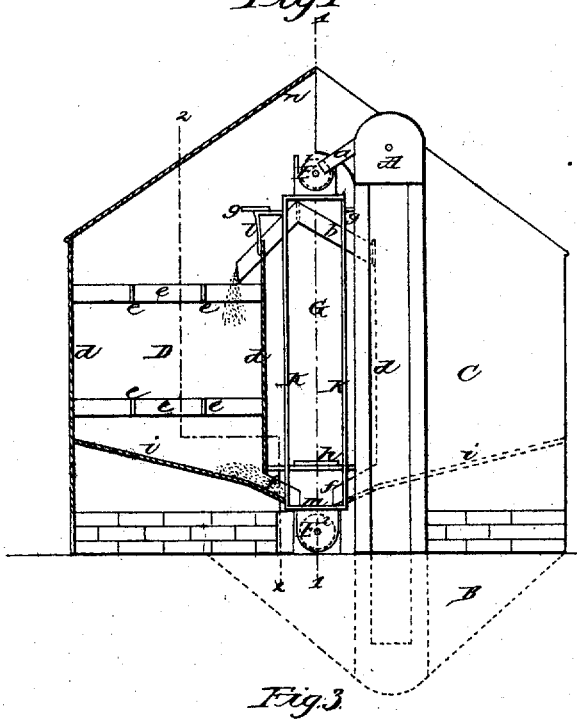

See Chro. 22 Fig 1.

Witnesses;

M. Gardner.

W. S. Chase

Inventors

Henry I. Chase

Philander F. Chase

Edwin D. Chase per their Attorney

G. B. Fowler.

UNITED STATES PATENT OFFICE.

HENRY I. CHASE, PHILANDER F. CHASE, AND EDWIN D. CHASE, OF PEORIA, ILLINOIS.

IMPROVEMENT IN GRAIN-ELEVATORS.

Specification forming part of Letters Patent No. 138,994, dated May 20, 1873; reissue No. 6,227, dated January 12, 1875; application filed January 6, 1875.

DIVISION A.

*To all whom it may concern:*

Be it known that we, HENRY I. CHASE, PHILANDER F. CHASE, and EDWIN D. CHASE, of the city of Peoria, in the county of Peoria and State of Illinois, have invented certain new and useful Improvements in Elevating, Conveying, Storing, and Shipping Grain; and we do hereby declare that the following is a full, clear, and exact description thereof, that will enable others skilled in the art to which it appertains to make and use the same, reference being had to the accompanying drawings, and to the letters of reference marked thereon, which form a part of this specification.

Figure 2:
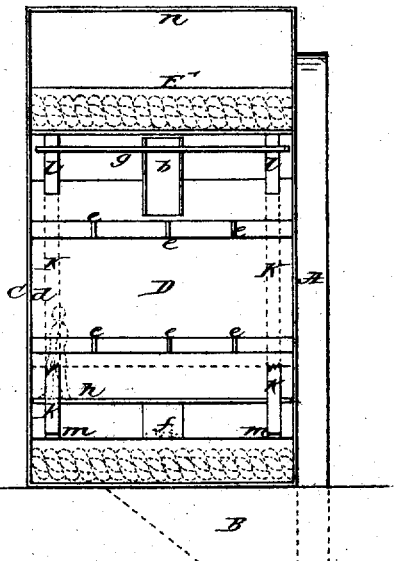
Figure 3:
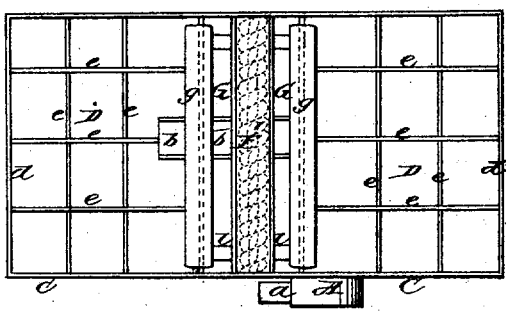
Figure 4:
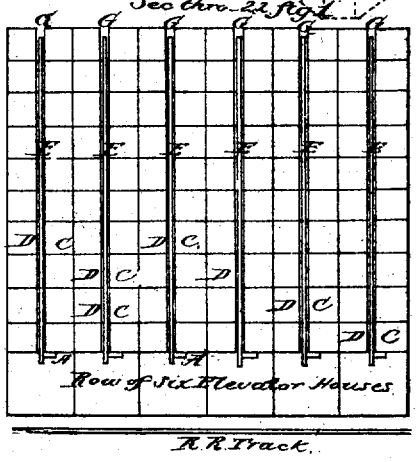

Figure 1 is a front elevation of the grain-house, the left half of the same being shown in section; Fig. 2, a sectional elevation, as seen from the left of Fig. 1, along the dotted lines 2 2 of the latter figure. Figs. 3 and 4 are plan views.

Like letters in all the figures of the drawing indicate like parts.

This invention consists, first, in the peculiar construction of elevator-houses, in combination with proper grain houses or bins extending out from them, the latter being about sixteen feet square and about the same height, arranged in rows running out from the elevator-buildings, and built thus low and directly upon the ground to obviate the enormous pressure of accumulated grain in houses of many stories, and more freedom from damage by fire; second, in providing an open passage between each double row of grain-bins extending from the ground upward, and in which open passage the conveyers have an independent foundation, and extend from the elevator to the rear of the line of bins to secure said conveyers from derangement from settling of any part of the bins; third, in the employment of parallel lines of conveyers for doing the work of moving the grain, the elevators being merely used to raise it above the level of the top of the bins.

The following is the construction of the elevator-houses and their annexed line of bins, the number of each not being material to the principle involved. The numbers here used merely indicate proportion between the elevator-buildings and the bins or store-houses. (See Fig. 4.) Six elevator-buildings built in a line, each about forty feet high by about twenty feet square, each having a grain-sink beneath it about twelve feet deep, with an ordinary elevator about forty feet high, operated by an upright shaft and line of shafting in the top and bottom of the houses. These elevator-buildings are shown at Fig. 4 in the drawing, but the elevator proper A is shown attached to the outside of one of the bins, and rising from a grain-sink, merely to illustrate the connection of the bins with the same. There are no grain-sinks under the bins. Each elevator-house has a grain-house or long line of bins, C D, attached to it, consisting of two rows of bins, D D, extending out at right angles with an open passage, G, between each double row of bins, in which passage the upper and lower line of conveyers are built, so as to secure for them an independent foundation, as before mentioned. The elevator-building has a wagon-way on the first floor through the house, for the convenience of receiving grain from wagons. The lower conveyer, $E^2$, is built upon the ground, and the upper conveyer is supported from the ground or from the lower conveyer by posts *k k*. A building for grain on this plan, covering one acre, consists of six double lines of bins, C D, about sixteen feet square, and about two hundred feet in length, holds about six hundred thousand bushels in secure storage, at a cost of about ten cents per bushel, whereas on the old plan of high elevators the storage would cost about thirty-five cents per bushel. The bins D D are each about sixteen feet square, built of studding two by eight, and fourteen inches apart, covered with one-inch boards, the floor sloping toward the conveyer $E^2$. The bins are tied by stock-boards *e e e*, nailed to the studding, one set horizontally across each way at the top of each bin, and another set in a similar manner is placed in the middle of each bin. Spouts *f f* discharge grain from the sloping floors of the latter into the conveyer $E^2$. The upper conveyers, $E^1$, also discharge grain by spouts laterally into the bins on either side. A platform, *g g*, from which to superintend this conveyer, is supported partly by the posts *k k* and partly by the sides of the bins. A similar platform is placed over the lower conveyer. Each conveyer consists of a continuous line of screws, made in sections, united by gudgeons. Each section is a continuous spiral iron screw or flight about eighteen inches in diameter, winding along a central shaft, $E^1$, about eight inches in diameter, and about twelve or more feet in length, coupled to each adjoining section by gudgeons, and supported in journal-boxes suspended from the top of the conveyer-trough.

The operation of this system of handling and storing grain is as follows: When corn or grain is to be stored it is shoveled into a hoppered sink, B, under the elevator, from whence it is raised by elevating to the top of the house, where it is spouted into a weigh-hopper, and thence into the conveyer $E^1$, and carried along the Archimedean screw at the rate of fifty or more bushels per minute; whence it passes through the traps in the trough or conveyer into the lateral bins D D. In shipping produce, it passes from each bin by spout *f* into the lower conveyer, $E^2$, and is brought back to the elevator, which discharges it into the weigh-hoppers, and is spouted thence into the cars on the adjoining track.

When the operator desires to change from oats to corn or other grain, he first inserts a bunch of broom-corn into trough of conveyer, holding the projecting portion of the broom while the screw carries it along, and sweeping itself clean to a single grain.

The advantages of this system are, first, that it is unnecessary to elevate grain any higher than from forty to forty-five feet, and will not strain the buildings when stored in bins but sixteen feet high, and is vastly more secure from damage by fire. Such storage is obtained at about one-fourth of the ordinary cost, as the plan above described holds about six hundred thousand bushels, and covers one acre, at a cost of about fifty thousand dollars, while an ordinary elevator holding the same amount costs about two hundred thousand dollars; second, that a polished conveyer-trough and continuous conveyer-flight moves grain in a horizontal line with fourth the power required to lift its dead-weight an equal distance. To convey grain on this system at the rate of one hundred bushels per minute, twenty pounds of steam are fully sufficient, whereas to elevate the same quantity requires fifty pounds of steam; third, the bins, built sixteen feet only in height, hold grain at a much less risk of damage by fire, by reason of the small amount of material used in their construction, so much so that grain will not be very materially damaged by a fire, but in such case can be all saved in a slightly-damaged condition.

Having thus fully described our invention, what we claim therein as new, and desire to secure by Letters Patent, is—

1. The system described of receiving, conveying, storing, and shipping grain in rows of bins C D, of one story in height, arranged on either side of an upper and lower line of conveyers, $E^1$ $E^2$, one line for receiving and distributing grain, the other for discharging the same, constructed to operate substantially as and for the purposes set forth.

2. The system described of a combination of elevator-houses, G G, in one line, of not more than two stories in height, from each of which runs back at a right angle a double line of store-bins, having an upper and lower line of conveyers $E^1$ $E^2$ built on independent foundations, substantially as and for the purposes set forth.

3. The construction and combination of the bins C D, walls *d d*, stays *e e e*, floor *i*, spouts *f f*, passages *g g*, conveyers $E^1$ $E^2$, posts *k k*, spout *b*, platforms *g h*, and elevator A, substantially as set forth.

In testimony that we claim the foregoing we have hereunto set our hands.

HENRY I. CHASE.
PHILANDER F. CHASE.
EDWIN D. CHASE.

Witnesses:
H. S. HILL,
H. G. CHASE.